UNITED STATES PATENT OFFICE.

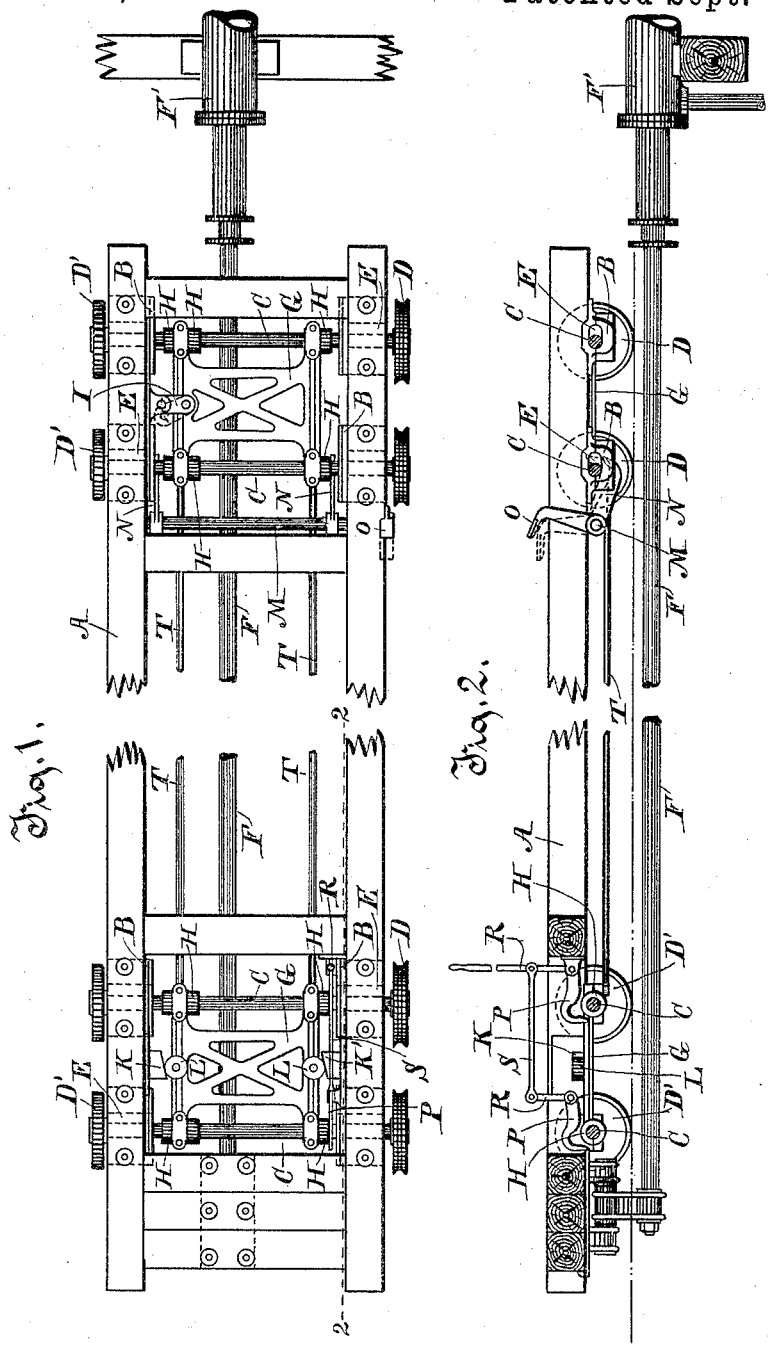

THEODORE S. WILKIN, OF MILWAUKEE, WISCONSIN.

SAW-MILL CARRIAGE.

SPECIFICATION forming part of Letters Patent No. 436,621, dated September 16, 1890.

Application filed December 10, 1889. Serial No. 333,260. (No model.)

*To all whom it may concern:*

Be it known that I, THEODORE S. WILKIN, of Milwaukee, in the county of Milwaukee and State of Wisconsin, have invented new and useful Improvements in Saw-Mill Carriages; and I do hereby declare the following to be a full, clear, and exact description of said invention, reference being had to the accompanying drawings, and to the letters of reference marked thereon, which form a part of this specification.

My invention relates to saw-mill carriages, and particularly to a form of carriage and co-operating mechanism for effecting the offsetting of the carriage while running back from the line of its travel while the saw is cutting through the log and returning it to such line of travel just as the running forward is commenced, and for locking the carriage against such lateral movement.

Various forms of devices have heretofore been used for offsetting the carriage while running back and returning it to position; but the novel features of my device, hereinafter to be claimed, are in the peculiar construction of the mechanism whereby the lateral or offsetting movements are accomplished by the action of the travel of the carriage and synchronously therewith as well as in harmony with the movement of the carriage in its line of travel. This novel mechanism is also so constructed that the carriage while performing all its other functions can be locked against such lateral movement, if desired, as it sometimes is, as I provide a locking device therefor.

In the drawings, Figure 1 is a top plan view of a saw-mill carriage broken away centrally for convenience of illustration, in which my devices are embodied, different or modified forms being shown in the two ends of the figure. Fig. 2 is a vertical longitudinal section of the left-hand part of Fig. 1 on line 2 2 thereof, the remaining portion of the view being an elevation of that side of the carriage which is at the bottom of the figure, the supporting-wheels only being removed.

The carriage hereinafter shown and described is a form of log-carriage adapted for use with a band-saw mill, the saw being located near that edge of the carriage which is at the top in Fig. 1, the log to be sawed being placed on the carriage near to and projecting beyond the edge of the carriage, so that as the carriage travels forward the saw will cut through the log.

A is the frame of the carriage, which is provided with boxes B B, through which pass the axles C C, which axles are each provided with a grooved wheel D and a flat-edged wheel D'. The grooved wheels are at one side of the carriage and travel on a rail that enters the groove whereby the wheels are guided, and the wheels having a flat periphery travel on a corresponding flat rail. The boxes B B are each provided with an elongated horizontal slot E, whereby a limited endwise movement of the carriage on the axles is permitted. The carriage is secured rigidly to the outer end of a piston-rod F, which enters the steam-cylinder F', through which means the carriage is caused to travel forward and back on its supporting-tracks. Any other method of reciprocating the carriage could be used. The axles C C are slightly longer between the wheels D and D' than the width of the carriage-frame, so that the carriage may have slight lateral movement thereon. A bridge-frame G is supported and carried on the two axles that are near together at each end of the carriage, the axles passing movably through parts of the frame, the frame being secured in position so as to have lateral horizontal movement in common with the axles by means of collars H H, rigid on the axles on both sides of the frame-bearing and retaining the axles in parallel position.

To accomplish the offsetting or lateral movement of the carriage with reference to the axles, a link I is pivoted at one end to the carriage and at the other end to the frame G, or as a modified means of accomplishing this offsetting or lateral movement of the carriage the inclines K and K', located one on each side of the carriage and inclined reversely to the line of its travel, have bearings against the frame G, preferably through anti-friction wheels L L thereon. Either form of device may be used for this purpose; but when the link I is used such links should be located at both ends of the carriage in connection with the bridge-frames G G, or if the inclines K K' are used these should be located at both ends of the carriage and use only the one form of device in the same carriage.

It will be understood by reference to Figs. 1 and 2 that the carriage as there shown is at or nearly at its extreme limit of travel toward the left and that the motion has been reversed and the carriage started toward the right, whereby the carriage has run forward in that direction on the axles until they are at the rear or left side of the slots E E and the link I or incline K' has forced the carriage laterally to the limit of its travel, (toward the top in Fig. 1), in which position, with reference to the bridge-frames G G and the track, the carriage will remain throughout its travel toward the right, but that when the motion of the carriage is again reversed toward the left the carriage will run over the axles until they shall be at the right of the slots E E, and the carriage by the action of the link I or the incline K will be carried laterally slightly in the reverse direction, thereby offsetting it or carrying it away from the saw.

It is sometimes desirable to cause the carriage to travel in line with the saw-cut without offsetting, and to lock the carriage against such lateral movement a rock-shaft M has its bearings in the carriage-frame A, which rock-shaft is provided with rigid hooks N N, adapted to be thrown around an axle C and lock it in position with reference to the endwise movement of the carriage-frame thereon, so that any forward or backward movement of the carriage-frame carries the axle correspondingly with it. A pedal O is affixed rigidly to the rock-shaft M, whereby conveniently to operate the hooks N N.

As a modified form of device for locking the carriage-frame against lateral movement an arm or arms P P may be used, which are pivoted at one end on the carriage-frame and at their free ends are adapted to enter the spaces about the axles between the collars H H and the side of the frame and block the lateral movement of the carriage-frame with reference to the axles. A lever-handle R, rigid to the arm P, is adapted to throw the arm into or out of its seat, and two of these arms may be connected together by a connecting-rod S.

T T are stay-rods secured to the frames G G.

What I claim as new, and desire to secure by Letters Patent, is—

1. In a saw-mill, the combination, with a carriage-frame having axle-boxes provided with elongated horizontal slots for the axles, and means for moving the frame endwise connected directly to the carriage-frame, of axles provided with supporting-wheels traveling on guiding-wheels, which axles extend through the slots in the boxes and support the carriage-frame movable limitedly laterally and endwise thereon, a bridge-frame carried on the axles having no movement endwise or laterally independent of the axles, and mechanism attached to the carriage and to the bridge-frame, substantially as described, for forcing the carriage-frame laterally on the axles as it is moved endwise by the power-supplying mechanism.

2. In a saw-mill, the combination, with a carriage-frame supported movable limitedly laterally and endwise on axles provided with guiding-wheels, and the piston-rod of an engine or other equivalent means connected directly to the carriage-frame, of a frame supported on the axles, which frame has no lateral or endwise movement independent of the axles, and means, substantially as described, in connection with the frame on the axles and the carriage-frame, for forcing the carriage-frame laterally on the axles limitedly as it is moved endwise, as set forth.

3. In a saw-mill, the combination, with a carriage-frame riding on two or more axles and movable limitedly thereon endwise and laterally independent of the axles, of the axles on which said carriage is supported movable limitedly, which axles are provided with traveling and guiding wheels, and bridge-frames riding on and connecting the axles in pairs parallel to each other, the bridge-frames having no endwise or lateral movement independent of the axles on which they ride, whereby the axles are held constantly in parallel position, substantially as described.

4. In a saw-mill carriage having a carriage-frame supported and movable limitedly endwise and laterally on axles provided with traveling and guiding wheels, and having devices that normally shift the carriage laterally automatically as the carriage is moved endwise, and a lever-arm pivoted on the carriage-frame, one arm of the lever being formed and arranged to engage an axle or between a collar thereon and the carriage-frame and prevent the lateral or endwise movement of the carriage-frame independent of the axles, substantially as described.

In testimony whereof I affix my signature in presence of two witnesses.

THEODORE S. WILKIN.

Witnesses:
C. T. BENEDICT,
C. H. KEENEY.